US007199756B2

(12) United States Patent
Cha et al.

(10) Patent No.: US 7,199,756 B2
(45) Date of Patent: Apr. 3, 2007

(54) PLANAR ANTENNA FOR WIRELESS COMMUNICATION DEVICE AND PORTABLE COMPUTER USING THE SAME

(75) Inventors: Kwang-hwan Cha, Suwon (KR); Young-ki Kim, Hwaseong-gun (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 439 days.

(21) Appl. No.: 10/701,597

(22) Filed: Nov. 6, 2003

(65) Prior Publication Data

US 2004/0097270 A1 May 20, 2004

(30) Foreign Application Priority Data

Nov. 19, 2002 (KR) ...................... 10-2002-0071904

(51) Int. Cl.
*H04M 1/00* (2006.01)
*H04B 7/00* (2006.01)

(52) U.S. Cl. ................. 343/700 R; 455/82; 455/575.7; 343/702; 343/824

(58) Field of Classification Search ...... 455/90.1–90.3, 455/562.1, 566, 575.5, 575.7, 121, 82, 269, 455/272; 343/702, 824
See application file for complete search history.

(56) References Cited

U.S. PATENT DOCUMENTS

| | | | | |
|---|---|---|---|---|
| 5,138,328 | A | 8/1992 | Zibrik et al. | |
| 5,410,749 | A * | 4/1995 | Siwiak et al. | 455/280 |
| 6,339,400 | B1 | 1/2002 | Flint et al. | |
| 6,556,812 | B1 * | 4/2003 | Pennanen et al. | 343/702 |
| 6,795,028 | B2 * | 9/2004 | Stutzman et al. | 343/702 |
| 2002/0037757 | A1 * | 3/2002 | Kaiponen et al. | 455/575 |
| 2002/0061775 | A1 * | 5/2002 | Iwai et al. | 455/575 |
| 2002/0149525 | A1 * | 10/2002 | Mitsui | 343/702 |
| 2002/0171588 | A1 * | 11/2002 | Fang | 343/702 |
| 2003/0050094 | A1 * | 3/2003 | Boyle et al. | 455/557 |
| 2003/0058177 | A1 * | 3/2003 | Nishikido et al. | 343/702 |
| 2003/0098812 | A1 * | 5/2003 | Ying et al. | 343/702 |
| 2003/0107518 | A1 * | 6/2003 | Li et al. | 343/702 |
| 2004/0125025 | A1 * | 7/2004 | Stutzman et al. | 343/702 |
| 2004/0171403 | A1 * | 9/2004 | Mikkola | 455/550.1 |

OTHER PUBLICATIONS

Official Action issued by the Korean Intellectual Property Office in corresponding priority Korean Patent Application No. 2002-71904, filed Nov. 19, 2002, to the above-identified pending US patent application, dated Feb. 2, 2005, 1 page.

* cited by examiner

*Primary Examiner*—Simon Nguyen
(74) *Attorney, Agent, or Firm*—Staas & Halsey LLP

(57) ABSTRACT

A compact-size planar antenna uses, as a ground plane, a LCD-protective bracket of a portable wireless device with an LCD. The antenna includes a top plate spaced apart from the bracket by a predetermined distance, and a short circuit plate connected to the top plate and the bracket with both ends. A power feed line is connected to the top plate and the bracket with both ends, and a dielectric body having a high dielectric constant is arranged between the bracket and the top plate. The compact-size planar antenna is spaced apart from conductor parts of the portable wireless device by a predetermined distance, and formed at a left lower corner of the portable wireless device when viewed from back of the portable wireless device.

16 Claims, 7 Drawing Sheets

| Layer | Max value | Position | Min value | Position | Average | Standard deviation |
|---|---|---|---|---|---|---|
| 2400(MHz) | -4.57dB | 302.13deg | -13.70dB | 183.52deg | -8.70dB | -92.46 |
| 2442(MHz) | -4.35dB | 299.31deg | -12.60dB | 180.73deg | -8.25dB | -83.83 |
| 2484(MHz) | -4.30dB | 307.76deg | -13.64dB | 180.71deg | -8.45dB | -87.53 |

| Layer | Max value | Position | Min value | Position | Average | Average | Standard deviation |
|---|---|---|---|---|---|---|---|
| 2400(MHz) | 0.28dB | 313.42deg | -6.87dB | 76.25deg | -8.70dB | -8.70dB | -21.58 |
| 2442(MHz) | 0.37dB | 307.78deg | -6.57dB | 129.90deg | -8.25dB | -8.25dB | -21.34 |
| 2484(MHz) | -0.28dB | 310.61deg | -8.28dB | 76.23deg | -8.45dB | -8.45dB | -30.37 |

PLANAR ANTENNA FOR WIRELESS COMMUNICATION DEVICE AND PORTABLE COMPUTER USING THE SAME

CROSS-REFERENCE TO RELATED APPLICATIONS

This application claims the benefit of Korean Application No. 2002-71904, filed Nov. 19, 2002, in the Korean Intellectual Property Office, the disclosure of which is incorporated herein by reference.

BACKGROUND OF THE INVENTION

1. Field of the Invention

The present invention generally relates to a compact-size antenna and a personal computer using the same, and more particularly, to a compact-size planar antenna for a wireless communication device which provides high quality and performance by improving signal radiation and receptivity.

2. Description of the Related Art

Development of portable mobile communication terminals for a wireless communication service has been aimed for a wireless terminal (hereinafter a terminal) with more compactness and diversity, and lower power-consumption, and an antenna in such a terminal plays an important role that determines the quality of signal transmission and reception between the terminal and a base wireless station.

In the wireless communication terminal, which has to be compact-sized and at the same time guarantee smooth two-way communication, a non-directional and easy to keep antenna is demanded. Usually, such antennas include helical antennas, monopole antennas or a combined antenna having both the helical and monopole antennas. While the terminals with these antennas almost always have smooth communication without being constrained by the direction where the terminals are placed, the terminals also have the shortcoming of having an upper portion which is jutted out.

In order to solve the antenna jutting out shortcoming, for example a surface-mounted device (SMD) type antenna and a planar antenna have been proposed. These antennas have radiation patterns varying in accordance with design, and provide high portability as they are attachable inside the terminals.

The SMD type antenna is formed in a relatively small volume of space (i.e., micro-sized) by using a general multi-layer substrate and a dielectric fabrication method. In the initial development stage, the SMD type antennas were made in a manner that monopoles and small-size helical antennas are formed by using a high dielectric constant. Currently, however, various SMD type antennas are manufactured based on various pattern technologies. Currently available SMD type antennas mainly include, for example, chip antennas, stacked antennas, and pattern antennas. Being micro-sized, these SMD type antennas are mountable almost anywhere in the wireless communication device. In addition to high productivity, these SMD type antennas are quite advantageous, because they can be directly mounted on a circuit board instead of being built in the wireless communication device. However, these SMD type antennas are constrained by direction when mounted in the terminal body, thus they have bad signal receptivity and a poor radiation pattern.

Regarding a planar type antenna, a planar inverted F antenna (PIFA) is a representative example. The PIFA has a radiation pattern varying in accordance with the design, and also provides high portability because it can be attached to the upper or inner side of the wireless communication device. The PIFA antenna consists of a ground plane, a top-plate, and a feeder or a short-circuit plate. The ground plane is formed slightly larger than the top-plate, and is directly attached to a separate circuit board and inserted inside the side of the wireless communication device.

FIG. 1 is a radiation pattern graph of such a conventional PIFA antenna. As shown, the radiation of the antenna deviates from 0 dB. For example, on average, radiation is −8.70 dB in 2400 MHz, −8.25 dB in 2442 MHz, and −8.45 dB in 2484 MHz, which indicates that radiation pattern is relatively poor.

FIG. 2 is a graph of a voltage standing wave ratio (VSWR) of the conventional PIFA antenna. As shown, the VSWR is 2.5062 in 2.4 GHz, and 2.1995 in 2.442 GHz, which is above level 2 as shown in the graph and indicates not a good condition. The bottom of FIG. 2 indicates impedance of RF property, which is about 63Ω. As shown in FIGS. 1 and 2, the conventional compact-size planar antennas, including the PIFA antenna, have a shortcoming of a bad radiation pattern and a bad VSWR.

SUMMARY OF THE INVENTION

Accordingly, the present invention provides a compact-sized planar antenna having an improved radiation pattern and voltage standing wave ratio (VSWR).

Further, the present invention provides a portable computer with wireless communication capability, such as a wireless personal digital assistant (PDA), that includes the compact-sized planar antenna having an improved radiation pattern and VSWR.

Further, the present invention provides a portable computer with wireless communication capability that requires less number of parts, less maintenance, and a reduced manufacturing cost by improving (reducing) manufacturing assembly.

Additional aspects and/or advantages of the invention will be set forth in part in the description which follows and, in part, will be obvious from the description, or may be learned by practice of the invention.

The present invention may be achieved by a compact-size planar antenna comprising a LCD-protective bracket, a top plate spaced apart from the bracket by a predetermined distance, and a short circuit plate connected to the top plate and the bracket with both ends.

According to an aspect of the invention, a power feed line is connected to the top plate and the LCD-protective bracket with both ends.

According to an aspect of the invention, the top plate comprises a first plate in a rectangular shape and a second plate larger than the first plate, the first and the second plates being integrally formed with each other.

According to an aspect of the invention, the power feed line is connected to a side of the first plate, while the short circuit plate is connected to the second plate of the top plate.

According to an aspect of the invention, a dielectric body having a high dielectric constant is arranged between the LCD-protective bracket and the top plate. The dielectric body comprises a ceramic material.

The present invention may also be achieved by a portable computer having a liquid crystal display (LCD) and a bracket protecting the LCD, the portable computer comprising a compact-size planar antenna having a top plate spaced from the LCD-protecting bracket by a predetermined distance, and a short circuit plate attached to the top plate and the LCD-protecting bracket with both ends, the planar antenna using the LCD-protecting bracket as a ground plane.

According to an aspect of the invention, the compact-size planar antenna further comprises a power feed line connected to the top plate and the LCD-protecting bracket with both ends.

According to an aspect of the invention, the top plate comprises a first plate in a rectangular shape and a second plate larger than the first plate, the first and the second plates integrally formed with each other.

According to an aspect of the invention, the power feed line is connected to a side of the first plate, while the short circuit plate is connected to the second plate of the top plate.

According to an aspect of the invention, the compact-size planar antenna is spaced apart from conductor parts of the portable computer by a predetermined distance, and formed at a left lower corner of the portable computer, when viewed from back of the portable computer.

BRIEF DESCRIPTION OF THE DRAWINGS

The above aspects and/or other aspects and advantages of the present invention will become apparent and more readily appreciated from the following description of the embodiments taking in conjunction with the attached drawings, in which.

DETAILED DESCRIPTION OF THE PREFERRED EMBODIMENTS

Figure 1:
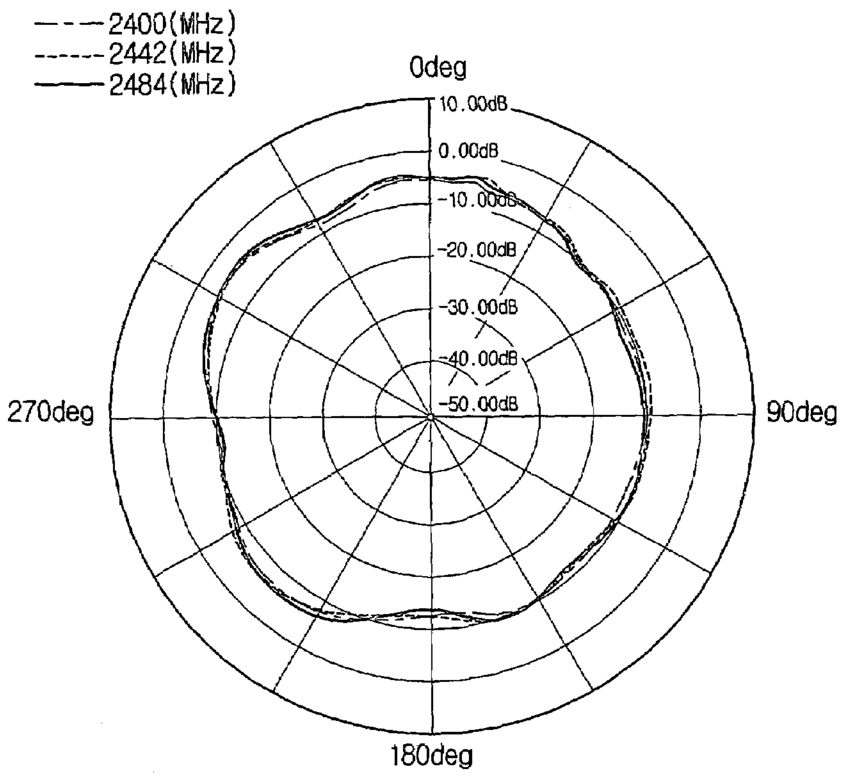
FIG. 1 (PRIOR ART)
FIG. 1 is a graph of a radiation pattern of a conventional compact-sized planar antenna.
Figure 2:
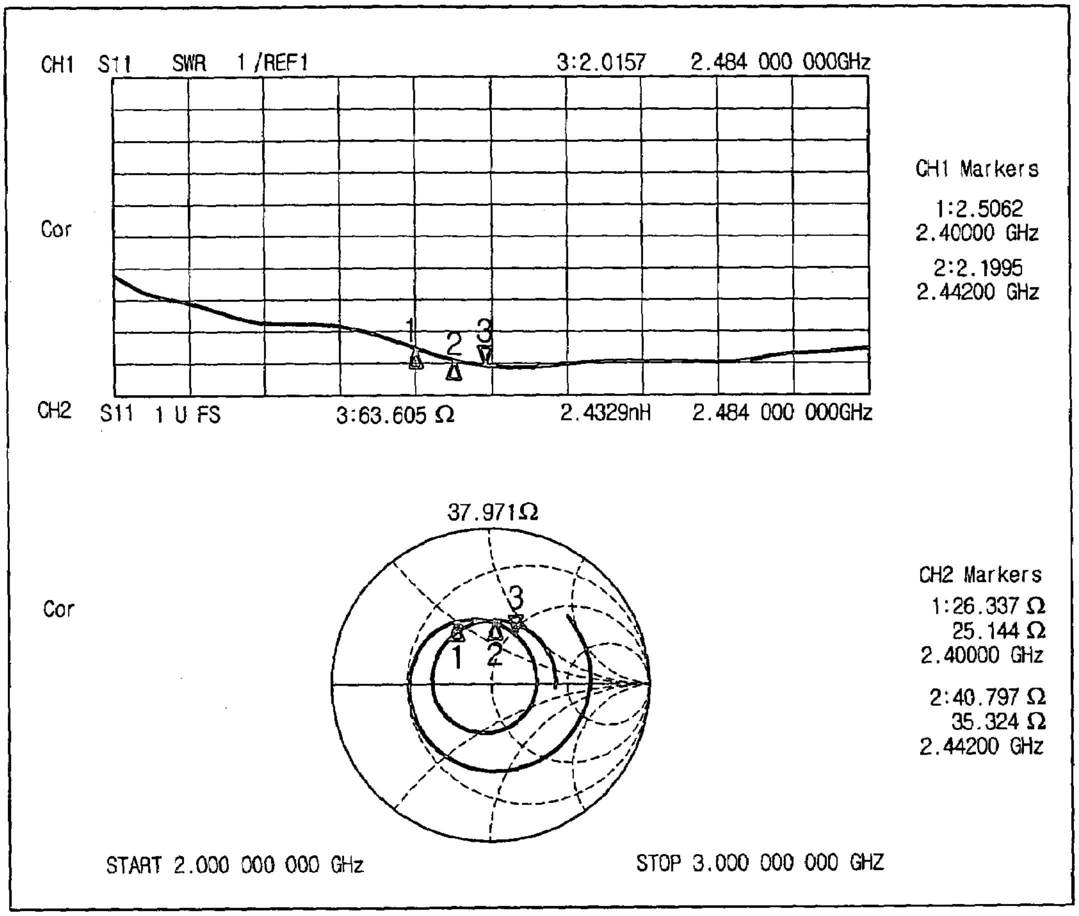
FIG. 2 (PRIOR ART)
FIG. 2 is a graph of a voltage standing wave ratio (VSWR) of the conventional compact-sized planar antenna.

Reference will now be made in detail to the present embodiments of the present invention, examples of which are illustrated in the accompanying drawings, wherein like reference numerals refer to the like elements throughout. The embodiments are described below to explain the present invention by referring to the figures.

Figure 3:
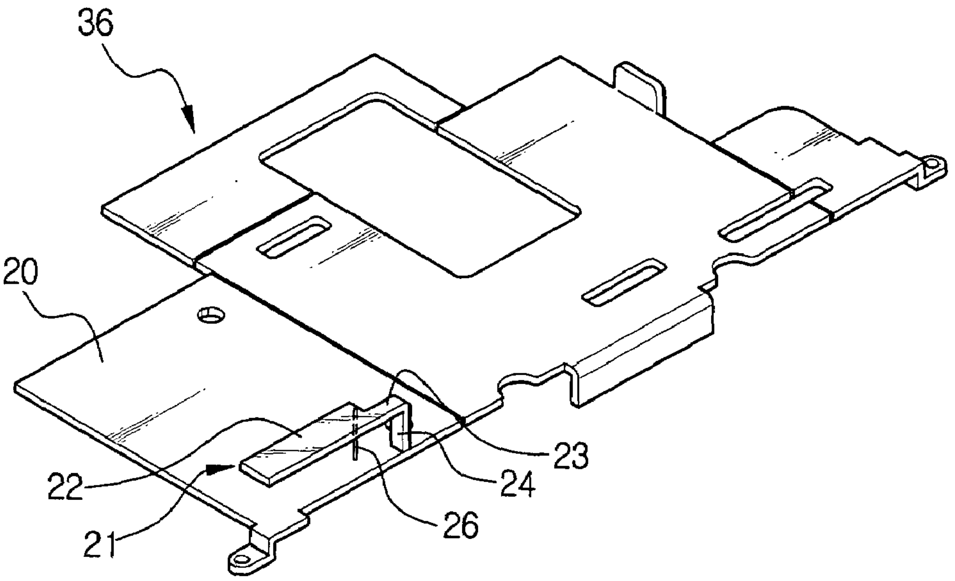
FIG. 3 is a perspective view of a compact-sized planar antenna, according to an embodiment of the present invention.

FIG. 3 is a perspective view of a compact-size planar antenna, according to an (first) embodiment of the present invention. In FIG. 3, the compact-size planar antenna 36 has a LCD-protective bracket 20 as an antenna ground plane. The LCD-protective bracket is a conventional bracket employed in general wireless communication devices to protect an LCD in the wireless devices. In other words, the present invention uses, as a ground plane, a conventional LCD-protective bracket provided in a wireless communication device to protect an LCD. In particular, as shown in FIG. 3, the compact-size planar antenna 36 comprises the LCD-protective bracket 20, a top plate 21, a power feed line 26 and a short circuit plate 24.

Configuration of the LCD-protective bracket 20 may vary in accordance with the type of the wireless communication device being in use. However, because any wireless communication device has the protective bracket if it employs the LCD, the bracket can be used as a ground plane. For example, FIG. 3 shows a general LCD-protective bracket 20 which is usually used in the PDAs.

The top plate 21 is much smaller than the LCD-protective bracket 20 in size, and the top plate 21 provides a radiation patch/receiving function, which radiates and receives wireless frequency signals, via a coupling of the power feed line 26 and the short circuit plate 24. Typically, the top plate 21 comprises a first plate 22 and a second plate 23 integrally connected with each other, with the first plate 22 formed to have a larger surface area, typically, a slightly larger surface area (wider) than the second plate 23 as shown in FIG. 3. Typically, the first and second plates are rectangular, although, the present invention is not limited to such a configuration and other shapes can be used as appropriate to establish wireless communication according to the present invention radiation and VSWR performance.

Typically, one end of the power feed line 26 is connected to one end of the first plate 22, while the other end is connected to the LCD-protective bracket 20. The power feed line 26 is used in transmitting/receiving the high frequency wireless signals. Typically, one end of the short circuit plate 24 is connected to one side of the second plate 23, while the other end is connected to the LCD-protective bracket 20. The short circuit plate 24 is at a predetermined distance from the power feed line 26, and accordingly can vary an impedance property of the antenna.

In the present embodiment, the top plate 21, the power feed line 26 and the short circuit plate 24 (i.e., the planar antenna connectable components according to the first embodiment of the present invention) are connected to a distal end of the LCD-protective bracket 20. However, the present invention is not limited to such a configuration and the planar antenna connectable components can be connected to anywhere on the LCD-protective bracket 20. In particular, the planar antenna connectable components can be placed in an appropriate position in accordance with a structure and a configuration of the wireless communication device being in use. Typically, the top plate 21, the power feed line 26 and the short circuit plate 24 are spaced apart from conductor parts (i.e., conductive elements of the PDA, such as interfaces, circuit boards, etc.) of the wireless communication device as much as possible. Therefore, according to the present invention, a compact-size planar antenna is constructed by connecting the top plate 21 and the short circuit plate 24 to the LCD-protective bracket 20.

Figure 4:
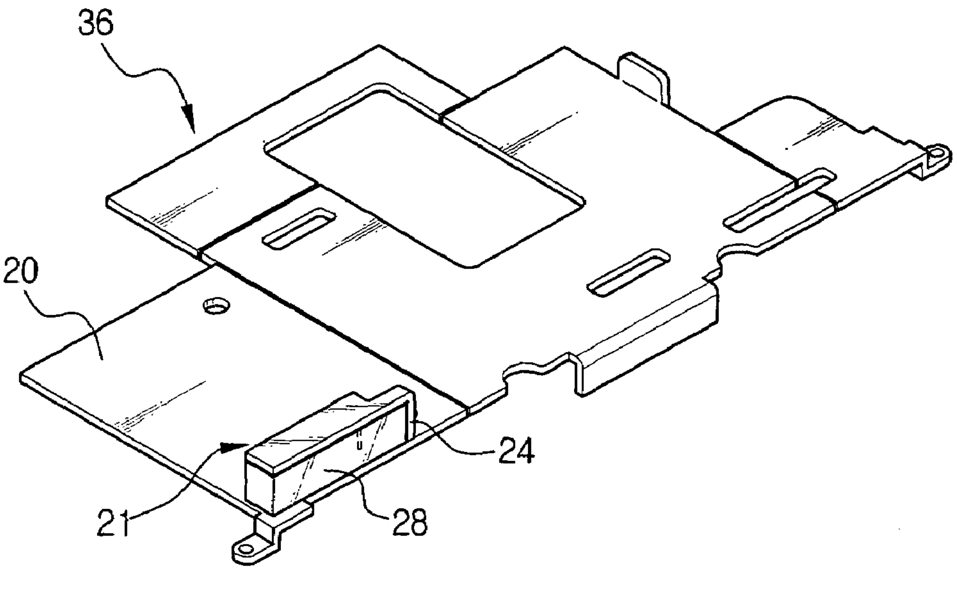
FIG. 4 is a perspective view of a compact-sized planar antenna, according to another embodiment of the present invention.

FIG. 4 is a perspective view of a compact-size planar antenna, according to another (second) embodiment of the present invention. As shown in FIG. 4, the compact-size planar antenna connectable components further comprises a dielectric body 28 between the top plate 21 and the LCD-protective bracket 20. Typically, the dielectric body 28 is a ceramic having a high dielectric constant.

Meanwhile, it is a well-known fact that the radiation pattern and the receptivity of the antenna are better when the ground plane is wider. Accordingly, in the present invention embodiments, sufficient surface area is ensured as the ground plane, because the LCD-protective bracket 20 of the wireless terminal is used as the ground plane. Accordingly, the present invention can provide improved VSWR and radiation pattern. Also, because there is no need to employ a separate structure as the ground plane, the number of parts and assembly for the compact-sized planar antenna is reduced, thereby reducing manufacturing costs.

Figure 5:
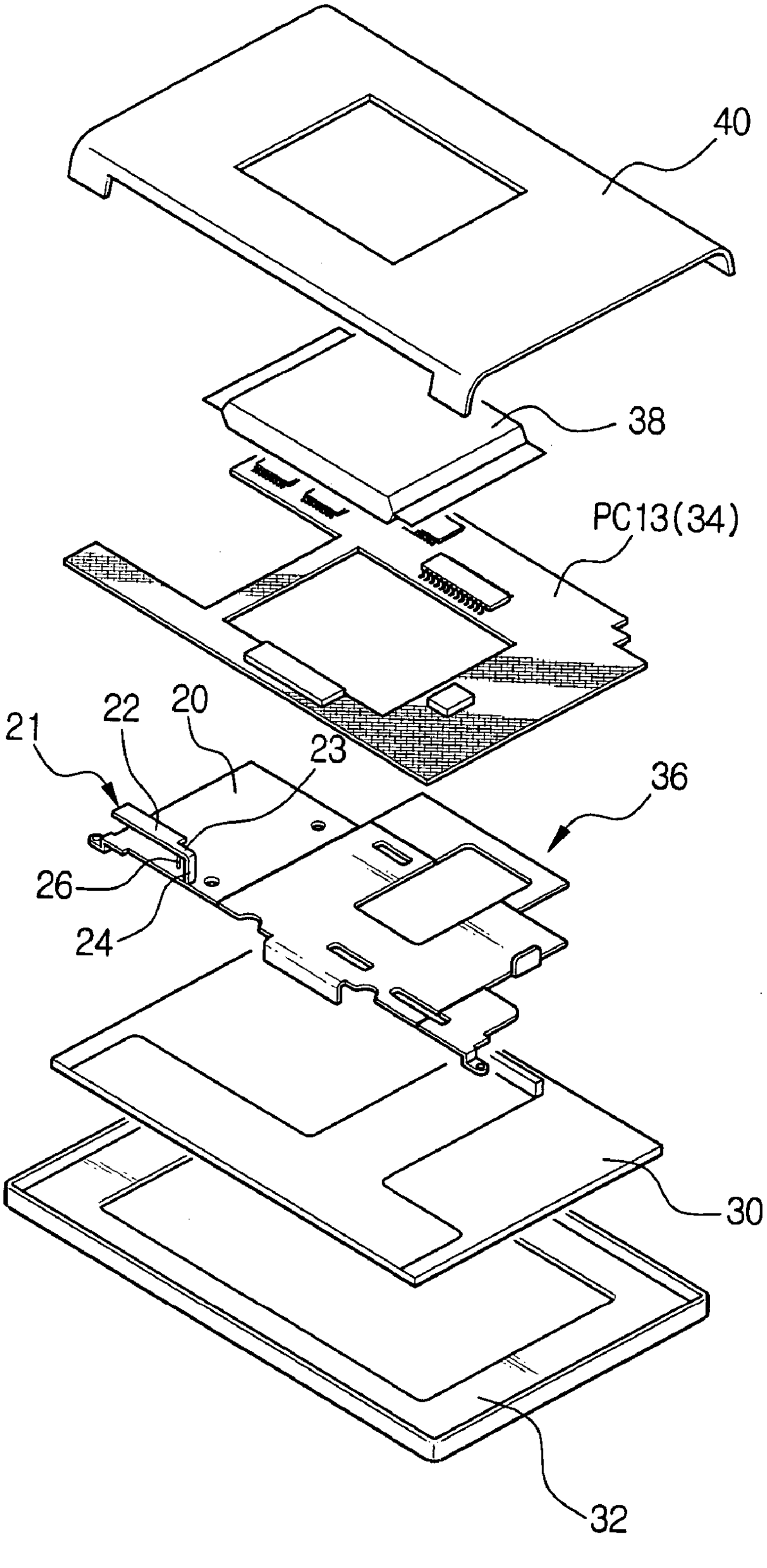
FIG. 5 is an exploded perspective view schematically showing the compact-sized planar antennas shown in FIGS. 3 and 4 incorporated in a personal digital assistant with wireless communication capability (PDA), according to an embodiment of the present invention.

FIG. 5 is an exploded perspective view schematically showing the compact-sized planar antennas shown in FIGS. 3 and 4 incorporated in a personal digital assistant with wireless communication capability (PDA) according to an embodiment of the present invention. In the following description, the like elements which have been described above with respect to the planar antenna will be designated by the same reference numerals. The FIG. 5 PDA incorporates the planar antenna 36 and, accordingly, the PDA comprises a LCD 30, a front cover 32 covering the LCD 30, an LCD-protective bracket 20 protecting the LCD 30, the planar antenna connectable components 21, 24, 26, and 28 (as the case may be) connected to the LCD-protective bracket 20, a printed circuit board 34, a battery 38 and a rear cover 40.

There may be one or more printed circuit boards 34 according to the PDA design/structure, and because the structure of the printed circuit board 34, the battery 38 and the front and rear covers 32, 40 is the same as general PDAs, an additional description thereof will be omitted. Typically, as described above, the compact-size planar antenna connectable components comprises the top plate 21, the LCD-protective bracket 20, the power feed line 26 and the short circuit plate 24. The compact-size planar antenna 36 may be in communication with processing components of the PDA, such as the printed circuit boards 34, according to known techniques.

Figure 6:
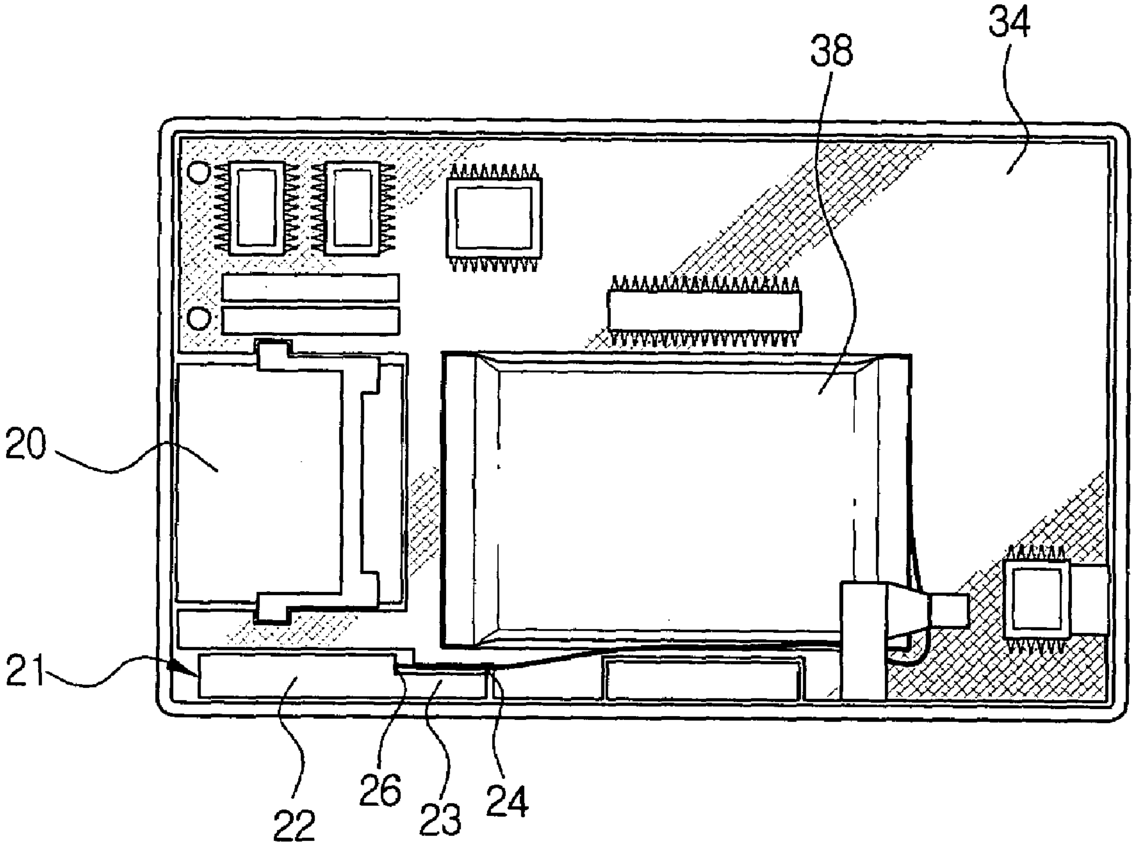
FIG. 6 is a schematic view of the PDA shown in FIG. 5 and showing an interior of the PDA viewed from a rear side of the PDA with the PDA rear cover removed.

FIG. 6 is a schematic view of the PDA shown in FIG. 5 and showing an interior of the PDA viewed from a rear side of the PDA when the rear cover 40 is removed. As shown in FIG. 6, when viewed from the back, typically, the top plate 21, the power feed line 26 and the short circuit plate 24 are attached to the left lower side of the LCD-protective bracket 20. Further, typically, the planar antenna connectable components 21, 24, 26 and 28 (as the case may be) are spaced apart from the conductor parts of the PDA as much as possible.

More particularly, the top plate 21 comprises the first plate 22 and the second plate 23 which are integrally connected with each other. The first plate 22 is formed to have a wider, typically slightly wider, surface area than the second plate 23. One end of the power feed line 26 is connected to a side of the first plate 22, while the other end is connected to the LCD-protective bracket 20. One end of the short circuit plate 24 is connected with a side of the second plate 23, and the other end is connected to the LCD-protective bracket 20. The radiation pattern and the VSWR of the PDA according to above-described planar antenna is greatly improved from a PDA with a conventional planar antenna (i.e., the conventional PDA), because the LCD-protective bracket 20 provides a sufficiently large ground area for the compact-size planar antenna.

Figure 7:
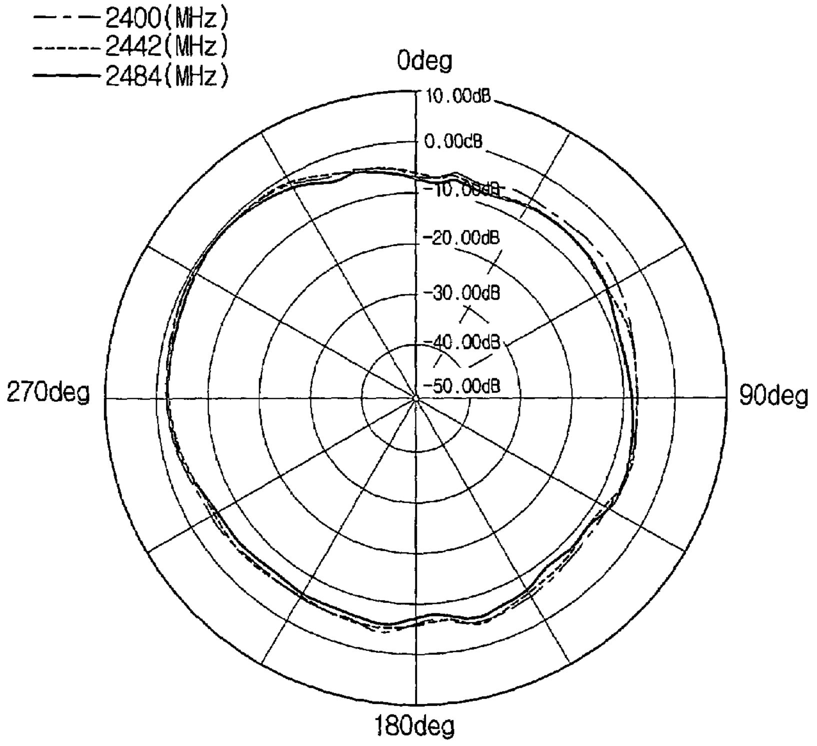
FIG. 7 is a graph of a radiation pattern of the PDA according to the present invention.
Figure 8:
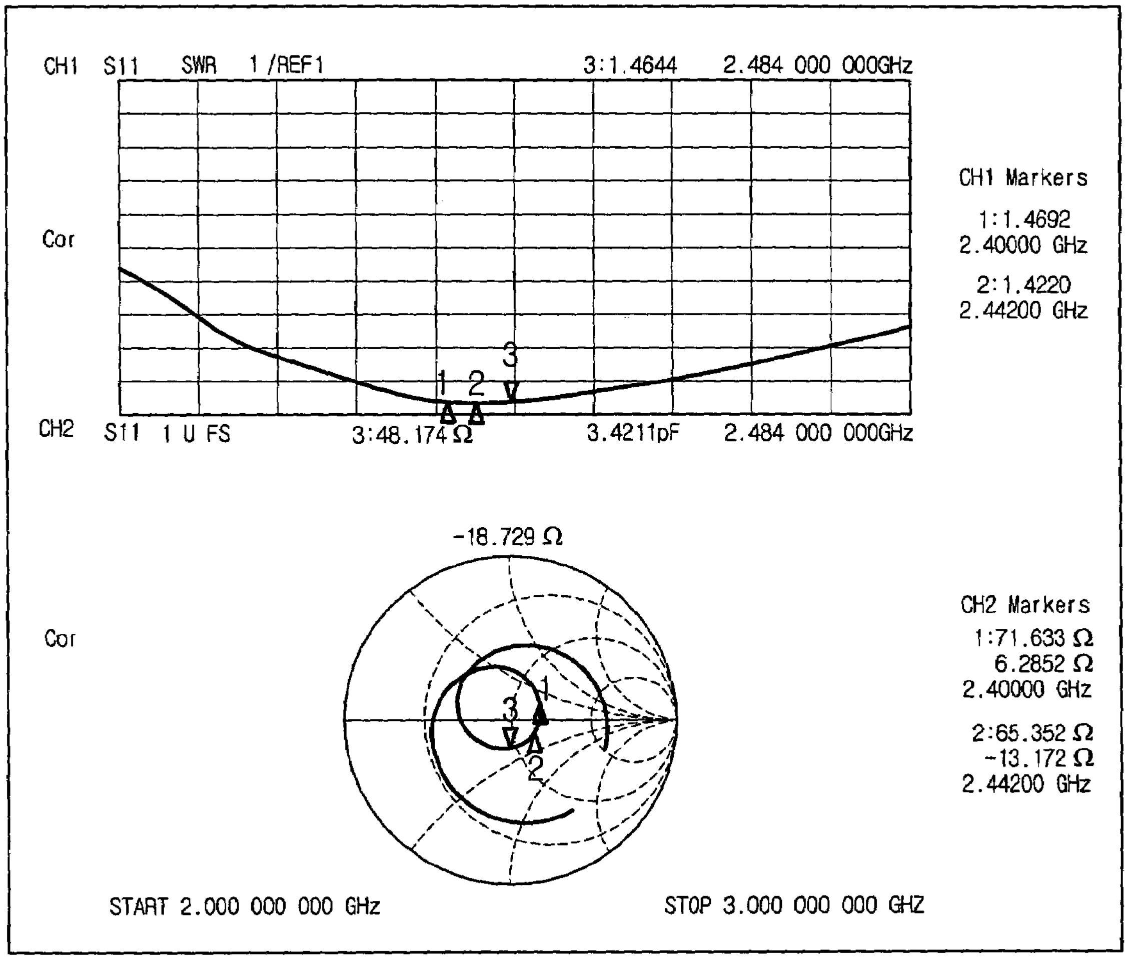
FIG. 8 is a graph of a voltage standing wave ratio (VSWR) of the PDA according to the present invention.

FIG. 7 shows the radiation pattern of the PDA according to the present invention. As shown in FIG. 7, generally, the radiation pattern is in the proximity to 0 dB. On average, the radiation pattern is −3.82 dB in 2400 MHz, −3.78 dB in 2442 MHz, and −4.66 dB in 2484 MHz. In other words, the radiation pattern is greatly improved from the radiation pattern of the conventional PDA shown in FIG. 1, and the radiation pattern of the present invention's PDA is very (substantially) close to 0 dB (i.e., greater than −5.0 dB to 0 dB). Referring to FIG. 8, the voltage standing wave ratio (VSWR) of the present invention's PDA is 1.4692 in 2.4 GHz, and 1.4228 in 2.442 GHz, which hover between levels 1 and 2. The impedance of RF property as shown in the bottom of FIG. 8 is also in the proximity to 50Ω, and, thus, lower than impedance of RF property of the conventional PDA shown in FIG. 1.

As described above, the PDA according to the present invention has an improved radiation pattern and VSWR, also has a longer signal receiving length and is directionally not limited. According to the present invention, because a sufficient ground area (i.e., a substantially larger surface area, or a larger surface area than a slightly larger surface area, than the top plate) for the compact-size planar antenna is ensured using the LCD-protective bracket, which is a simple fixture support in any wireless terminal having the LCD, the planar antenna can have an improved VSWR and radiation pattern. Further, according to the present invention, because the already available LCD-protective bracket of the wireless terminal is used as the ground plane, there is no requirement for a separate structure, and as a result, the number of parts and assembly is reduced. Further, because the LCD-protective bracket is used as the ground plane, a jutted out terminal portion requirement can be avoided. Therefore, the present invention provides a portable wireless device (e.g., a wireless computing device, such as a PDA, a wireless telephone, etc.) having a liquid crystal display (LCD), the device comprising a compact-size planar antenna using, as an antenna ground plane, an LCD-protective bracket of the LCD. The antenna comprises a top plate spaced apart from the LCD-protective bracket by a predetermined distance, a short circuit plate connected to the top plate and the LCD-protective bracket with both ends, and a power feed line connected to the top plate and the bracket with both ends. More particularly, the antenna comprises a top plate having a first portion and a second portion smaller in surface area (narrower), typically, slightly narrower, than the first portion, the top plate spaced apart from the LCD-protective bracket by a predetermined distance. A short circuit plate is provided with one end connected to the second portion of the top plate and another end connected to the LCD-protective bracket, and a power feed line is provided with one end connected to the first portion of the top plate and another end connected to the LCD-protective bracket.

Although a few embodiments of the present invention has been described, it will be understood by those skilled in the art that the present invention is not be limited to the described embodiments, but various changes and modifications can be made within the spirit and scope of the present invention as defined by the appended claims and their equivalents.

What is claimed is:

1. A compact-size planar antenna, comprising:

a liquid crystal display (LCD)-protective bracket;

a top plate spaced apart from the bracket by a predetermined distance and comprising a first plate and a second plate integrally formed with the first plate, the first plate having a larger surface area than the second plate, the first plate and the second plate being parallel to the bracket; and a short circuit plate connected to the top plate and the bracket at both ends.

2. The compact-size planar antenna of claim 1, further comprising a power feed line connected to the top plate and the bracket at both ends.

3. The compact-size planar antenna of claim 2, wherein the power feed line is connected to a side of the first plate of the top plate and the short circuit plate is connected to the second plate of the top plate.

4. The compact-size planar antenna of claim 1, further comprising a dielectric body having a high dielectric constant and arranged between the bracket and the top plate.

5. The compact-size planar antenna of claim 4, wherein the dielectric body comprises a ceramic material.

6. The compact-size planar antenna of claim 1, wherein the first plate has an approximately rectangular shape and the second plate is smaller than the first plate.

7. A portable computer with wireless communication capability and having a liquid crystal display (LCD) with a bracket protecting the LCD, the portable computer comprising:

a compact-size planar antenna using the bracket as a ground plane and comprising: a top plate spaced from the bracket by a predetermined distance and comprising a first plate and a second plate integrally formed with the first plate, the first plate having a larger surface area than the second plate, the first plate and the second plate being parallel to the bracket; and a short circuit plate attached to the top plate and the bracket at both ends.

8. The portable computer of claim 7, wherein the compact-size planar antenna further comprises a power feed line connected to the top plate and the bracket at both ends.

9. The portable computer of claim 8, wherein the compact-size planar antenna is spaced apart from conductor parts of the portable computer by a predetermined distance.

10. The portable computer of claim 9, wherein the compact-size planar antenna is formed at a left lower corner of the portable computer, when viewed from back of the portable computer.

11. The portable computer of claim 7, wherein the power feed line is connected to a side of the first plate of the top plate, while the short circuit plate is connected to the second plate of the top plate.

12. The compact-size planar antenna of claim 7, wherein the first plate has an approximately rectangular shape and the second plate is smaller than the first plate.

13. A portable wireless device having a liquid crystal display (LCD), the device comprising:

a planar antenna using an LCD-protective bracket of the LCD as an antenna ground plane;

a top plate spaced apart from the LCD-protective bracket by a predetermined distance, the top plate having a first portion and a second portion narrower than the first portion, the top plate spaced apart from the LCD-protective bracket by a predetermined distance, the first portion and the second portion being parallel to the bracket;

a short circuit plate connected to the top plate and the LCD-protective bracket with both ends, one end of the short circuit plate being connected to the second portion of the top plate and another end of the short circuit plate being connected to the LCD-protective bracket; and a power feed line connected to the top plate and the LCD-protective bracket with both ends, one end of the power feed line being connected to the first portion of the top plate and another end of the power feed line being connected to the LCD-protective bracket.

14. The device of claim 13, wherein a radiation pattern of the antenna is substantially close to 0dB.

15. The device of claim 13, wherein a voltage standing wave ration (VSWR) of the antenna hovers between 1 and 2.

16. A portable wireless device having a liquid crystal display (LCD) and a bracket protecting the LCD, the device comprising a planar antenna using the LCD-protective bracket having a larger surface area than a top plate of the antenna as a ground plane, the top plate comprising a first plate and a second plate integrally formed with the first plate, the first plate having a larger surface area than the second plate, the first plate and the second plate being parallel to the bracket.

* * * * *